United States Patent
Borges et al.

(10) Patent No.: US 11,852,501 B2
(45) Date of Patent: Dec. 26, 2023

(54) COSTMAP GENERATION FOR USE IN PLANNING A PATH THROUGH AN ENVIRONMENT

(71) Applicant: COMMONWEALTH SCIENTIFIC AND INDUSTRIAL RESEARCH ORGANISATION, Acton (AU)

(72) Inventors: Paulo Borges, Acton (AU); Thomas Lowe, Acton (AU); Tirthankar Bandyopadhyay, Acton (AU); Riley Bowyer, Acton (AU)

(73) Assignee: COMMONWEALTH SCIENTIFIC AND INDUSTRIAL RESEARCH ORGANISATION, Acton (AU)

( * ) Notice: Subject to any disclaimer, the term of this patent is extended or adjusted under 35 U.S.C. 154(b) by 0 days.

(21) Appl. No.: 17/911,508

(22) PCT Filed: Mar. 18, 2021

(86) PCT No.: PCT/AU2021/050244
§ 371 (c)(1),
(2) Date: Sep. 14, 2022

(87) PCT Pub. No.: WO2021/189100
PCT Pub. Date: Sep. 30, 2021

(65) Prior Publication Data
US 2023/0095898 A1     Mar. 30, 2023

(30) Foreign Application Priority Data

Mar. 26, 2020   (AU) ............................... 2020900936

(51) Int. Cl.
*G01C 21/36*   (2006.01)
*B60W 60/00*   (2020.01)
(Continued)

(52) U.S. Cl.
CPC ......... *G01C 21/367* (2013.01); *B60W 60/001* (2020.02); *G01C 21/3822* (2020.08);
(Continued)

(58) Field of Classification Search
CPC .............. G01C 21/367; G01C 21/3822; G01C 21/3841; G01C 21/3407; G01C 21/34;
(Continued)

(56) References Cited

U.S. PATENT DOCUMENTS 8,630,802 B2    1/2014  Green
11,170,532 B1*  11/2021 Thomson ............. H04N 1/6061
(Continued)

FOREIGN PATENT DOCUMENTS

WO    WO 2011/004026 A2    1/2011

OTHER PUBLICATIONS

M. Bosse and R. Zlot, "Continuous 3d scan-matching with a spinning 2d laser," in Robotics and Automation, 2009. ICRA'09. IEEE International Conference on. IEEE, 2009, pp. 4312-4319.
(Continued)

*Primary Examiner* — Rami Khatib
(74) *Attorney, Agent, or Firm* — Bret E. Field; Bozicevic, Field & Francis LLP

(57) ABSTRACT

A system for generating a costmap for use in planning a path through an environment, the system including one or more suitably programmed processing devices configured to obtain a map of the environment, acquire traversal data indicative of an ability to traverse parts of the environment, for each part of the environment, calculate a traversal indicator indicative of the ability to traverse the part, the traversal indicator being calculated in a colour space, and colourise the map using the traversal indicators to thereby generate a colourised costmap indicative of an ability to traverse the environment, the colourised costmap allowing path planning to be performed.

17 Claims, 14 Drawing Sheets

(51) Int. Cl.
*G01C 21/00* (2006.01)
*G06T 11/00* (2006.01)

(52) U.S. Cl.
CPC ........ *G01C 21/3841* (2020.08); *G06T 11/001* (2013.01); *B60W 2555/00* (2020.02)

(58) Field of Classification Search
CPC ............ G01C 21/3453; B60W 60/001; B60W 2555/00; G06T 11/001; G01S 17/89; G01S 17/931; G01S 17/86; G01S 19/393; G05D 1/0274; G05D 1/0217; G05D 2201/0213; G06F 16/29
See application file for complete search history.

(56) References Cited

U.S. PATENT DOCUMENTS

| | | |
|---|---|---|
| 2005/0107950 A1 | 5/2005 | Gelhar et al. |
| 2009/0063034 A1 | 3/2009 | Han |
| 2015/0142251 A1 | 5/2015 | Aldereguia et al. |
| 2018/0340780 A1 | 11/2018 | Ito et al. |
| 2020/0064147 A1 | 2/2020 | Sliney |

OTHER PUBLICATIONS

M. Bosse, R. Zlot, and P. Flick, "Zebedee: Design of a springmounted 3-d range sensor with application to mobile mapping," IEEE Transactions on Robotics, vol. 28, No. 5, pp. 1104-1119, 2012.

P. Egger, P. V. K. Borges, G. Catt, A. Pfrunder, R. Siegwart, and R. Dub' e, "Posemap: Lifelong, multi-environment 3d lidar localization," in 2018 IEEE/RSJ International Conference on Intelligent Robots and Systems (IROS), 2018, pp. 3430-3437.

Pfrunder, P. V. Borges, A. R. Romero, G. Catt, and A. Elfes, "Realtime autonomous ground vehicle navigation in heterogeneous environments using a 3d lidar," in 2017 IEEE/RSJ International Conference on Intelligent Robots and Systems (IROS). IEEE, 2017, pp. 2601-2608.

M. Quigley, K. Conley, B. Gerkey, J. Faust, T. Foote, J. Leibs, R. Wheeler, and A. Y. Ng, "Ros: an open-source robot operating system," in ICRA workshop on open source software, vol. 3, No. 3.2. Kobe, Japan, 2009, p. 5.

\* cited by examiner

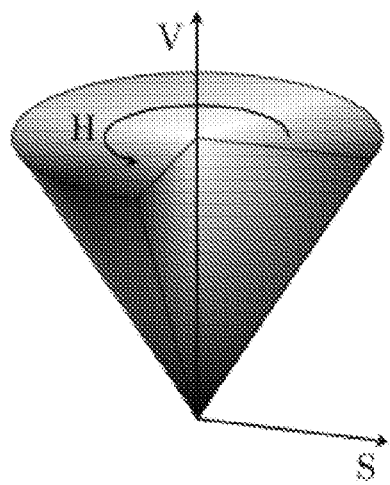 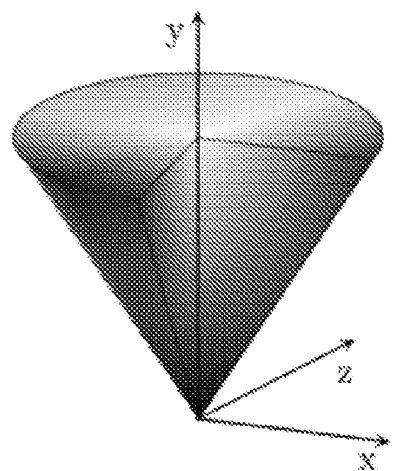
Fig. 7A　　　　　　　Fig. 7B
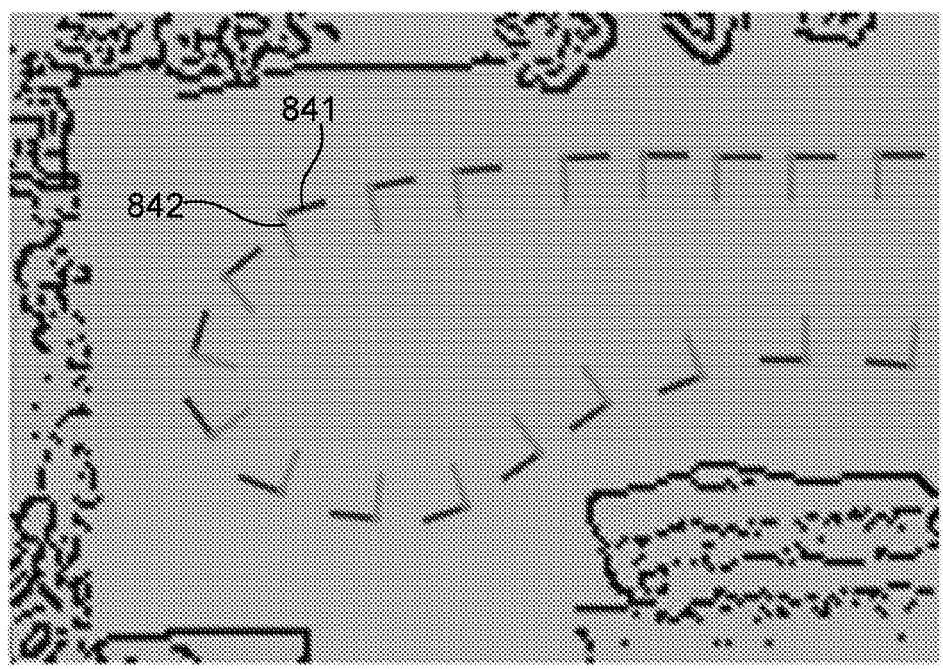
Fig. 8A

COSTMAP GENERATION FOR USE IN PLANNING A PATH THROUGH AN ENVIRONMENT

BACKGROUND OF THE INVENTION

The present invention relates to a method and apparatus for generating a costmap for use in planning a path through an environment, and in one particular example, to generating a colourised costmap that can be used for path planning. The present invention also relates to a method and apparatus for path planning, and in one particular example, to path planning using a colourised costmap.

DESCRIPTION OF THE PRIOR ART

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

Path planning is an essential element of autonomous vehicles. It defines, according to arbitrary criteria, the optimal (or near-optimal) path that a vehicle should follow to go from a starting point to an end-goal. In practice, the task is usually achieved by considering two main elements, namely global path planning and local path planning. The global plan provides the full and overall path based on a known map M of the environment, with the assumption that the world is static. As the vehicle moves through the global path, it often encounters moving obstacles or changes in the world (as identified by its on-board sensors) that were not originally incorporated in the map M. The local planner ideally avoids such obstacles and adapts the vehicle's path causing it to deviate from its original plan, however aiming to return to the global path as soon as the environmental circumstances allow.

Most traditional path planning algorithms are suited to scenarios in which the cost of travel is independent of the direction of travel. In other words, the path planned to go from a point A to a point B is identical to the path from point B to point A.

In most practical applications, however, discriminating the direction of travel is key to successful operations. On urban networks, for example, there exist a number of rules regarding lane directionality in both one-way and two-way roads, and failure to adhere to these rules can lead to accidents. Challenges also exist in 3D off-road terrains, for example where a vehicle is able to go downhill but not uphill on a given slope, or vice versa. In industrial areas or plants, there are frequently traffic rules for machinery (e.g., forklifts, trucks) and pedestrian areas.

Due to the nature of traffic, directionality in path planning is critical for self-driving cars. The directionality constraints in such scenarios are typically encoded as a directed graph representation with edge weights and an optimal path is found by running a minimum cost path search on such road networks. At a street level scale, road lane graphs are utilised to guide the self-driving vehicle on the directionality of motion. These lane graphs are partially algorithmically generated from higher-level street network map and partly human edited. These approaches soon become intractable in semi-structured and un-structured environments.

For unstructured rough terrains, the most popular approach is to generate a costed grid map, run A* or Dijkstra's algorithm on the maps for the global path and run more sophisticated model based local planners for online adaptation.

Often due to the simplification of real constraints and the abstraction of the problem, the prescribed global path generates paths that the local planner is unable to execute. An example is the terrain influenced by directionality constraints. As an example, the vehicle control and traction might only allow the vehicle to go in one direction, however getting stuck or losing traction in other directions from the same position. Global navigation functions are able to encode directionality into the map. Often this requires formulating a cost or a value function over the map that is then used to generate a navigation policy at each position. However, coming up with such cost functions is challenging as the contributors to the costs are always not measurable (effect of traction in mobility) and have coupled non-linear effects.

US20150142251 describes a vehicle control based on colors representative of navigation information are disclosed. According to an aspect, a method includes receiving an image of an object surface having multiple colors thereon that are representative of data for use in navigating a vehicle along a pathway. Further, the method includes controlling the vehicle to operate to navigate the pathway based on the image.

SUMMARY OF THE PRESENT INVENTION

In one broad form, an aspect of the present invention seeks to provide a system for generating a costmap for use in planning a path through an environment, the system including one or more suitably programmed processing devices configured to: obtain a map of the environment; acquire traversal data indicative of an ability to traverse parts of the environment; for each part of the environment, calculate a traversal indicator indicative of the ability to traverse the part, the traversal indicator being calculated in a colour space; colourise the map using the traversal indicators to thereby generate a colourised costmap indicative of an ability to traverse the environment, the colourised costmap allowing path planning to be performed.

In one embodiment the colourised costmap is colourised to indicate permitted directions of travel in different parts of the environment.

In one embodiment the colourised costmap is colourised so that different permitted directions of travel are indicated by different colours.

In one embodiment the colour space is at least one of: a hue/saturation colour space; a hue/saturation/value colour space; and, a hue/saturation/lightness colour space.

In one embodiment the colour space is a hue/saturation/value colour space and the colourised costmap is colourised so that: a directionality is indicated by a hue component; a directionality cost is indicated by a saturation component; and, an obstacle cost is indicated by a value component.

In one embodiment the traversal data is indicative of one or more paths within the environment and wherein the one or more processing devices are configured to: use the traversal data to calculate a path vector at each of a plurality of points along a path, the path vector being indicative of a direction of travel at that point on the path and being generated in the colour space; and, for each part of the environment: obtain path vectors within the part of the environment from one or more paths; and, generate a traversal indicator using the path vectors.

In one embodiment the one or more processing devices are configured to: determine a traversal direction at a point along the path; and, calculate the path vectors using the traversal direction by converting the traversal direction to the colour space.

In one embodiment the one or more processing devices are configured to: acquire trajectory data indicative of a trajectory of a vehicle travelling along the path; and, determine the traversal direction using the trajectory data.

In one embodiment the one or more processing devices are configured to generate a traversal indicator by combining the path vectors.

In one embodiment the one or more processing devices are configured to: combine the path vectors in a different colour space; and, generate the traversal indicator by converting results of the combining step into the colour space.

In one embodiment the one or more processing devices are configured to combine the path vectors in RGB colour space.

In one embodiment the one or more processing devices are configured to generate the traversal indicators by averaging path vectors.

In one embodiment the one or more processing devices are configured to: determine a weighting associated with the path vectors; and, generate the traversal indicators using a weighted average of the path vectors.

In one embodiment the one or more processing devices are configured to determine the weighting by inflating a direction of travel at the point on the path.

In one embodiment the one or more processing devices are configured to acquire the traversal data at least one of: in accordance with user input commands; by analyzing traversal of one or more vehicles through the environment; by receiving data from one or more vehicles through the environment; by receiving data from a mapping system, the mapping system including a mapping device that traverses the environment to thereby generate mapping data used to generate the map the environment.

In one embodiment the one or more processing devices are configured to: determine one or more candidate paths; and, display the one or more candidate paths on the colourised costmap to allow visual inspection of the one or more candidate paths.

In one embodiment the one or more processing devices are configured to: determining a start and goal; and, generate one or more candidate paths in accordance with the start and goal using the costmap.

In one broad form, an aspect of the present invention seeks to provide a method for generating a costmap for use in planning a path through an environment, the method including, in one or more suitably programmed processing devices: obtaining a map of the environment; acquiring traversal data indicative of an ability to traverse parts of the environment; for each part of the environment, calculating a traversal indicator indicative of the ability to traverse the part, the traversal indicator being calculated in a colour space; colourising the map using the traversal indicators to thereby generate a colourised costmap indicative of an ability to traverse the environment, the colourised costmap allowing path planning to be performed.

In one broad form, an aspect of the present invention seeks to provide a computer program product for generating a costmap for use in planning a path through an environment, the computer program product including computer executable code, which when executed by one or more suitably programmed processing devices causes the processing devices to: obtain a map of the environment; acquire traversal data indicative of an ability to traverse parts of the environment; for each part of the environment, calculate a traversal indicator indicative of the ability to traverse the part, the traversal indicator being calculated in a colour space; colourise the map using the traversal indicators to thereby generate a colourised costmap indicative of an ability to traverse the environment, the colourised costmap allowing path planning to be performed.

In one broad form, an aspect of the present invention seeks to provide a system for planning a path through an environment, the system including one or more suitably programmed processing devices configured to: obtain a colourised costmap indicative of a traversal ability of the environment; determine one or more candidate paths; and, use the one or more candidate paths and the colourised costmap to plan a path.

In one embodiment the one or more processing devices are configured to display the one or more candidate paths on the colourised costmap to allow visual inspection of the one or more candidate paths.

In one embodiment the colourised costmap is colourised to indicate permitted directions of travel along multiple different paths.

In one embodiment the colourised costmap is colourised so that different permitted directions of travel are indicated by different colours.

In one embodiment the colour space is at least one of: a hue/saturation colour space; a hue/saturation/value colour space; and, a hue/saturation/lightness colour space.

In one embodiment the colour space is a hue/saturation/value colour space and the colourised costmap is colourised so that: a directionality is indicated by a hue; a coat associated with the directionality is indicated by a saturation; and, a secondary cost is indicated by the value.

In one broad form, an aspect of the present invention seeks to provide a method for planning a path through an environment, the method including, in one or more suitably programmed processing devices: obtaining a colourised costmap indicative of a traversal ability of the environment; determining one or more candidate paths; and, using the one or more candidate paths and the colourised costmap to plan a path.

In one broad form, an aspect of the present invention seeks to provide a computer program product for planning a path through an environment, the computer program product including computer executable code, which when executed by one or more suitably programmed processing devices causes the processing devices to: obtain a colourised costmap indicative of a traversal ability of the environment; determine one or more candidate paths; and, use the one or more candidate paths and the colourised costmap to plan a path. It will be appreciated that the broad forms of the invention and their respective features can be used in conjunction and/or independently, and reference to separate broad forms is not intended to be limiting. Furthermore, it will be appreciated that features of the method can be performed using the system or apparatus and that features of the system or apparatus can be implemented using the method.

BRIEF DESCRIPTION OF THE DRAWINGS

Various examples and embodiments of the present invention will now be described with reference to the accompanying drawings, in which:

FIG. 7A is a schematic diagram of an example of a hue/saturation/value colour space;

FIG. 7B is a schematic diagram of the hue/saturation/value colour space mapped to a Cartesian coordinate system used in analysing traversal data;

FIG. 8A is a schematic diagram of an example of an environment map showing a sample vehicle trajectory;

DETAILED DESCRIPTION OF THE PREFERRED EMBODIMENTS

Figure 1:
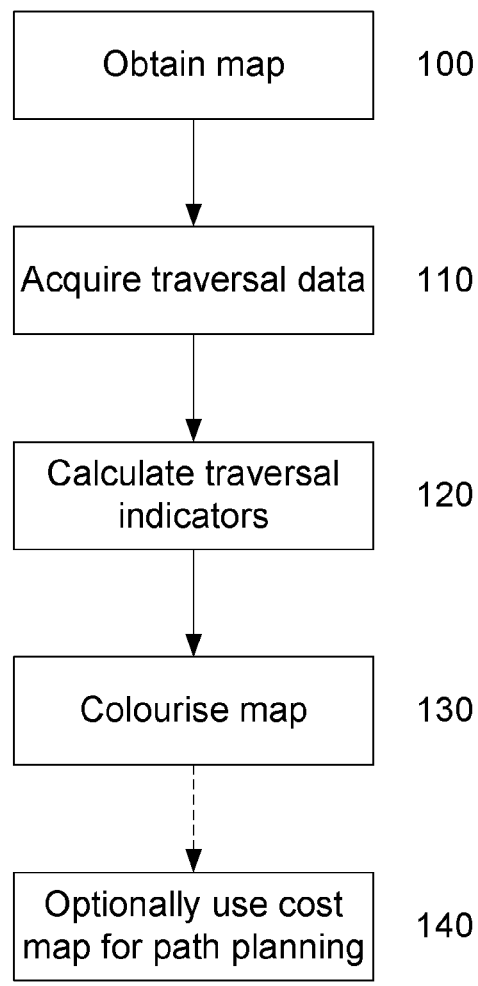
FIG. 1 is a flow chart of an example of a process for generating a costmap for use in planning a path through an environment.

An example of a method for generating a colourised costmap for use in planning a path through an environment will now be described with reference to FIG. 1.

For the purpose of illustration, it is assumed that the process is performed at least in part using one or more electronic processing devices forming part of one or more processing systems, such as computer systems, or the like, which may optionally be connected to one or more other devices via a network architecture, or the like. For ease of illustration the remaining description will refer to a processing device, but it will be appreciated that multiple processing devices could be used, with processing distributed between the devices as needed, and that reference to the singular encompasses the plural arrangement and vice versa.

In this example, at step 100, the processing device obtains a map of the environment. The manner in which this is achieved will vary depending upon the preferred implementation, and could include for example retrieving a previously generated map from a database or other repository, generating a map based on mapping data or a point cloud, or the like. Such techniques are known in the art and will not therefore be described in further detail. Nevertheless, it is noted that the map of the environment is typically a two dimensional environment map, examples of which are well known in the art.

At step 110 the processing device acquires traversal data indicative of an ability to traverse parts of the environment. The nature of the traversal data and the manner in which this is acquired will vary depending upon the preferred implementation. For example, the traversal data could be acquired by having one or more vehicles traverse the environment, with the vehicles being guided either autonomously, semi-autonomously, or driven by an operator. In this instance the traversal data could be collected by on-board sensors, including but not limited to GPS sensors, radar, LiDAR, or the like, and could represent a trajectory of the vehicle through the environment.

Additionally, and/or alternatively, the traversal data could be captured by static sensors provided within the environment, such as cameras or other imaging devices, or the like located in the environment. However, this is not essential, and other approaches could be used such as by having a user manually sketch feasible vehicle trajectories, or otherwise input details of parts of the environment that can or cannot be traversed. For example, this could include having an operator may use their inherent knowledge of the region in order to trace a path that can be driven by a vehicle through the environment, and optionally additionally overlay any applicable rules, such as road traffic rules or similar.

In one particular example, the traversal data can be derived from mapping data used to generate the environment map. In this example, the mapping data can be collected using a mapping system, such as a range sensor, that traverses the environment in order to collect range data indicative of a range to features within the environment. The range data can then be resolved into a point cloud and trajectory through the environment using a simultaneous localisation and mapping (SLAM) algorithm, allowing this to be used to both generate the map and traversal data.

At step 120, the processing device uses the traversal data to calculate traversal indicators indicative of the ability to traverse different parts of the environment. The traversal indicator is calculated in a colour space, so that the indicator is a colour which represents the ability to traverse that part of the environment. The ability to traverse the part of the environment could be binary, for example indicating the part of the environment can or cannot be traversed, but more typically is graded to reflect limitations on the traversal, for example to indicate directionality and the extent to which the directionality applies. For example, a lane on a motorway or highway might be highly uni-directional, whereas a single lane road could be bi-directional. Finally, a carpark or other similar area, might be multi-directional.

The parts for which indicators are determined are typically small regions, such as a group of one or more pixels in the final costmap, and are typically based on portions of a path traversed by a vehicle or similar, depending on the nature of the traversal data. Performing this process for multiple parts of the environment that can be traversed then allows the environment map to be colourised at step 130, thereby generating a colourised costmap indicative of an ability to traverse the environment.

Figure 2:
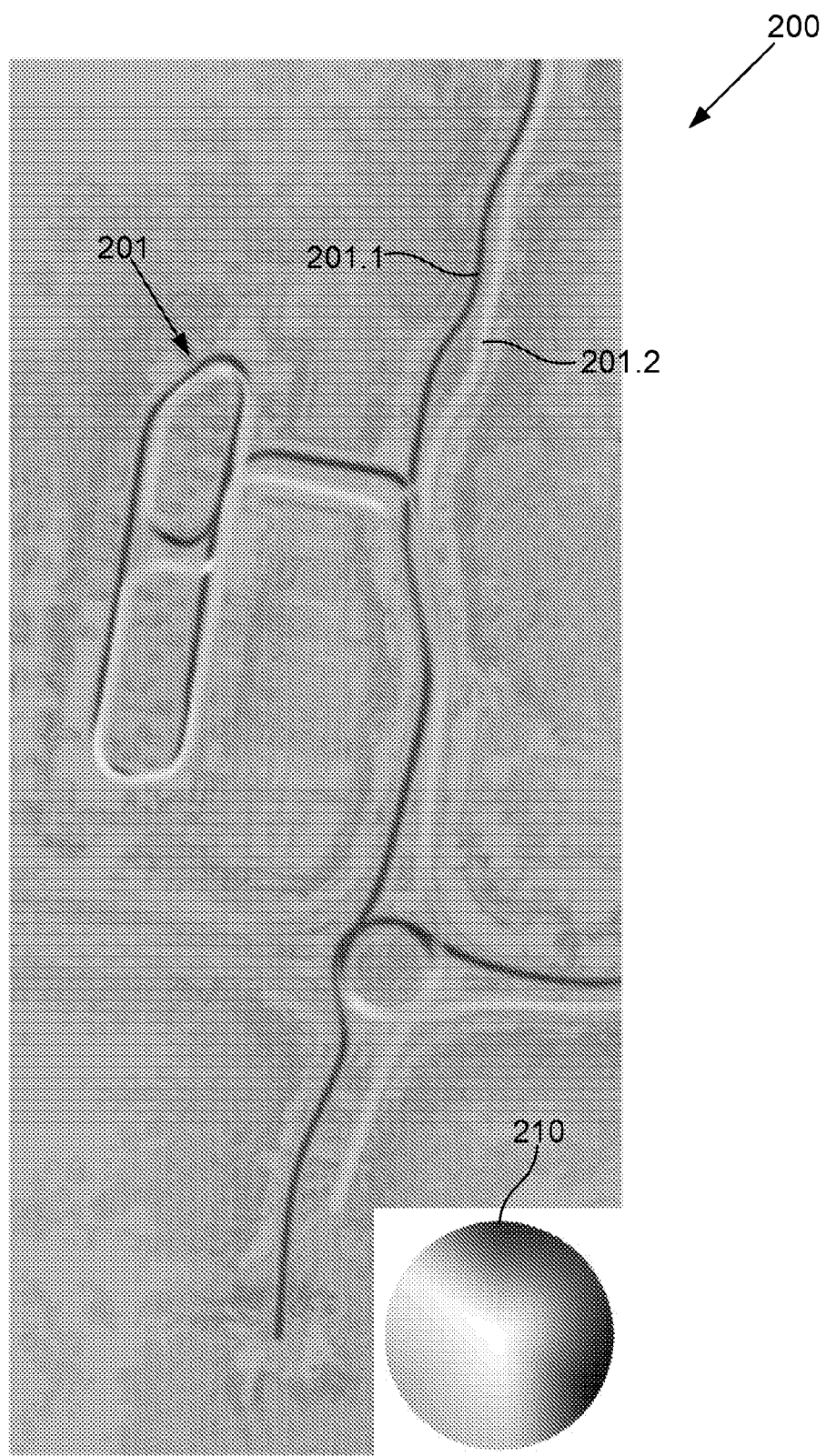
FIG. 2 is an example of a costmap.

An example of a colourised costmap is shown in FIG. 2.

In this example, the costmap shows a number of different vehicle paths 201 that can be traversed, with the paths being colourised to represent directionality requirements. In this example, the paths are roads that are colourised with a hue that represents a permitted direction of travel, as indicated by a colour mapping 210. In this example, the colour mapping includes a red colour at 0° (corresponding to a north direction in the map), purple at 60°, blue at 120°, cyan at 180°, green at 240° and yellow at 300°. Thus, road portions 201.1 coloured red indicate that the vehicle is permitted to travel north, whereas road parts 201.2 shown in cyan indicate that a vehicle is able to travel south. Thus, the colouring of any part of the road indicates a permitted direction of travel along the road.

Accordingly, the above described approach operates to utilise information regarding traversal of an environment to generate a costmap that is colourised in order to represent the ability of the environment to be traversed. In this regard, it will be appreciated that reference to the ability to traverse the environment can encompass physical restrictions over movement through the environment, as well as arbitrary rules applicable to traversal of the environment, or the like.

Once generated, the colourised costmap can then be used to allow path planning to be performed at step 140. In this regard, such planning can be performed using a combination of autonomous, semi-autonomous or manual techniques. For example, autonomous calculations can be performed by utilising colour as a cost function, allowing paths to be developed on a minimum cost basis. However, where human involvement is required, for example to review paths, these paths can then be displayed on the colourised costmap, allowing the paths to be easily visually assessed, in turn allowing an operator to make a decision as to whether a path is suitable.

A number of further features will now be described.

As mentioned above, in one example, the colourised costmap is colourised to indicate permitted directions of travel in different parts of the environment, and in particular, so that different permitted directions of travel are indicated by different colours. This allows visual inspection to be utilised in order to rapidly ascertain whether a proposed path meets directionality requirements. In particular, the direction of the proposed path can be compared to the colour displayed on the colourised costmap to determine if this meets the directionality requirements. Whilst the following examples will focus on directionality, it will be appreciated that similar approaches that could also be used to display other restrictions on traversal through an environment. For example, gradients could be colourised to allow visual inspection to be used to ascertain whether a slope can be traversed by a vehicle. In other examples, colour information could be used to represent limitations on speeds, velocity, acceleration, or other related information.

In one example, the colour space is a hue/saturation colour space, and in particular a hue/saturation/value (HSV) colour space or a hue/saturation/lightness (HSL) colour space. It will be appreciated from the following description that HSV is a particularly beneficial as this allows a range of different information to be conveyed, but this is not essential and any other suitable colour space could be utilised.

In one example, when the HSV colour space is used, the colourised costmap is colourised so that directionality is indicated by a hue component and a directionality cost is indicated by a saturation component. Thus, different directions can be mapped to RGB colours, with a highly saturated colour meaning directionality must be strictly adhered to, whereas a lower saturation means that there is a greater degree of flexibility over the directionality. As will become apparent from the following description, areas of the map in which there is no directionality limitation will typically appear white as a result of a minimal saturation. Additionally, the value component can then be used to indicate obstacle costs, with no restriction having a high value, and hence a white appearance, whilst impassable obstacles that cannot be traversed will have a black appearance.

In one example, the traversal data is indicative of one or more paths within the environment. In this regard, the term path will be understood to encompass a single traversal along a given route within the environment, so that multiple paths could encompass multiple passes or multiple vehicles travelling along a single route, as well as one or more vehicles travelling along multiple different routes.

Having identified a path from the traversal data, the processing device is configured to use the traversal data to calculate a path vector at each of a plurality of points along the path. The path vector is indicative of a direction of travel at that point on the path and is generated in the colour space, so that a path through the environment is effectively converted into a sequence of colour space path vectors distributed along the length of the path.

In one example, the processing device can be configured to determine a traversal direction at a point along the path from the traversal data, which might for example involve determining a vehicle trajectory from trajectory data indicative of a trajectory of a vehicle travelling along the path, and then determining the traversal direction using the trajectory, for example by extrapolating a direction of travel from the trajectory, or by deriving a vehicle pose from the trajectory data, depending on the nature of the data.

Having determined the direction of travel, this is then used to calculate the path vectors by converting the traversal direction to the colour space. This is typically achieved using a mapping, which relates different directions to different hue values, and an example of this will be described in more detail below.

Having calculated path vectors at multiple points for each path, the processing device can combine path vectors from multiple paths within respective parts of the environment, with these then that being used to generate traversal indicators. Thus, in this example, path vectors from multiple paths can be combined where these paths overlap to thereby generate traversal indicators within multiple different parts of the environment, which can then be used collectively to colourise the costmap.

It will be appreciated that combining path vectors from different paths allows for a greater understanding of directionality limitations. For example, on a single lane road, a single traversal of the road would result in the road being assigned a high degree of directionality. However, if the road is a single lane two way road, that is in effect bi-directional, this would only be ascertained if multiple paths along the road, corresponding to vehicles travelling in different directions, are considered. Similarly, on a one way road, considering multiple paths along the road will avoid a vehicle travelling in the wrong direction unduly affecting the directionality cost associated with that road.

The path vectors are typically combined in a different colour space, with the traversal indicator being generated by converting results of the combining step into the colour space. Thus for example, path vectors are generated in the HSV space can be combined in RGB space, allowing a linear combination of the path vectors to be used to generate a meaningful colour, with the resulting combined colour being converted back into HSV space.

The path vectors can be combined in any appropriate manner but in one example this is performed by averaging the path vectors, and in particular utilising a weighted average. In this regard, the weighting can be used to take into account the fact that directionality is not usually confined to a discrete point, but rather more typically applies to a region around a point. Nevertheless, further away from the point, the degree of certainty associated with the directionality decreases, which can be accounted for using a weighting. This in effect leads to a number of path vectors surrounding each point on the path, with the path vectors away from the point having a greater uncertainty in directionality and hence a reduced weight.

In one example, of this is achieved by inflating a direction of travel associated with a vehicle about the point on the path, so that it an assumption is made that points adjacent to the point currently under consideration would also have similar directionality requirements. It will be appreciated that any inaccuracies in this approach are typically compensated for by averaging path vectors from multiple different paths in any given parts of the environment. This also allows assumption regarding directionality to be propagated to areas of the environment that are not actually traversed, albeit with a low degree of directional certainty, allowing paths to blend into the background, as will be described in more detail below.

As previously mentioned, the traversal data can be determined in variety of manners, depending on the preferred implementation. For example, traversal data can be determined in accordance with user input commands, for example by having a user sketch permitted travel paths on the environment map. More typically this is achieved by analysing traverse of one or more vehicles through the environment and in particular by receiving data from one more vehicles moving through the environment, for example in the form of GPS or LiDAR data. In one particular example this can be achieved by receiving data from a mapping system which includes a mapping device that traverses the environment to thereby generate mapping data used to generate the map of the environment. For example, a vehicle fitted with a LiDAR and implementing a simultaneous localisation and mapping (SLAM) algorithm provides a point cloud data that can be used to generate the environment map, as well as trajectory of the mapping device through the environment, which in turn can that be are used as the traversal data.

Figure 3:
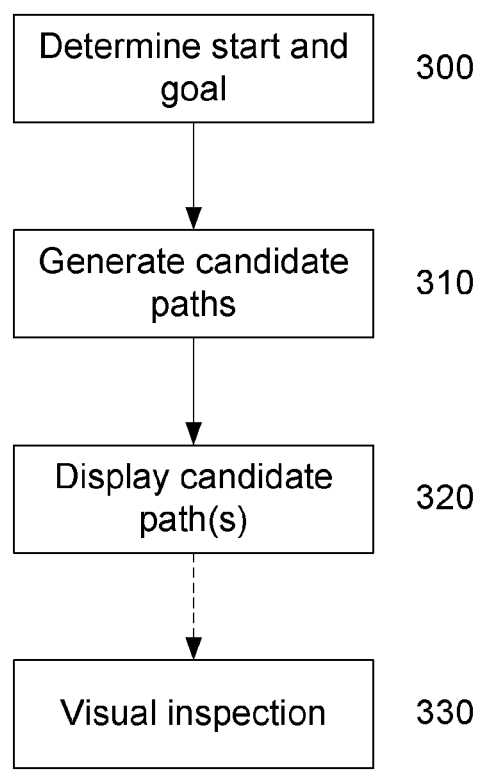
FIG. 3 is a flow chart of an example of a process for using a costmap to plan a path through an environment.

As previously mentioned, the system can be configured in order to allow path planning to be performed and an example of this process will now be described with reference to FIG. 3.

In this example, at step 300 a start and goal are determined, to represent a beginning and end of the route. The start and goal can be undetermined in any particular way, but in one example, this is achieved by having these are defined manually, although alternatively these are could be retrieved from pre-stored data, or the like.

At step 310 the processing device can generate at least one candidate path. The path can be generated utilising a variety of route planning approaches, such as map restrictor approaches and optionally can be calculated utilising the colourised costmap, using the colours as a cost function as will be described in more detail below. At step 320 candidate paths can then optionally be displayed, to allow a user to perform a visual inspection at step 330, to thereby assess the candidate path(s).

Accordingly, this approach allows the colourised costmaps to be used in autonomous and/or semi-autonomous manners, and in one particular example, allows visual inspection to be used to rapidly assess viability of autonomously derived paths.

In one example, the processing devices are configured to generate a path using the costmap. By generating a path using the costmap, a more optimal path (shorter/quicker/avoidance of dangerous obstacles) can be created. The distinction between a standard path and an optimal path generated by the costmap will be greater where the environment traversed includes a plurality of dangerous or difficult to overcome obstacles (where the optimal path may be counter intuitive to a user when initially viewing a map of the environment).

In one example, the processing devices are configured to navigate and/or control the vehicle through the environment in accordance with a path generated using the costmap and/or the costmap. This allows the vehicle to drive autonomously through the environment taking the costmap into account, either by following a path planned using the costmap, or by dynamically controlling the vehicle using the costmap, for example to avoid obstacles, make sure one way roads are navigated in the correct direction, or the like.

However, it will be appreciated that this is not essential and the costmap might be used to assist an individual driving a vehicle within an environment. In this instance, the costmap might be presented on a screen in the vehicle informing the user regarding where the vehicle can or cannot traverse. A conventional map of the environment would typically not show this information, particularly where there are variations in elevation or the presence of obstacles, that might prevent vehicle traversal. By presenting navigation instructions to the user, the user only needs to focus on direction the vehicle without needing to interpret the map nor devise a method for traversing the environment.

Figure 4:
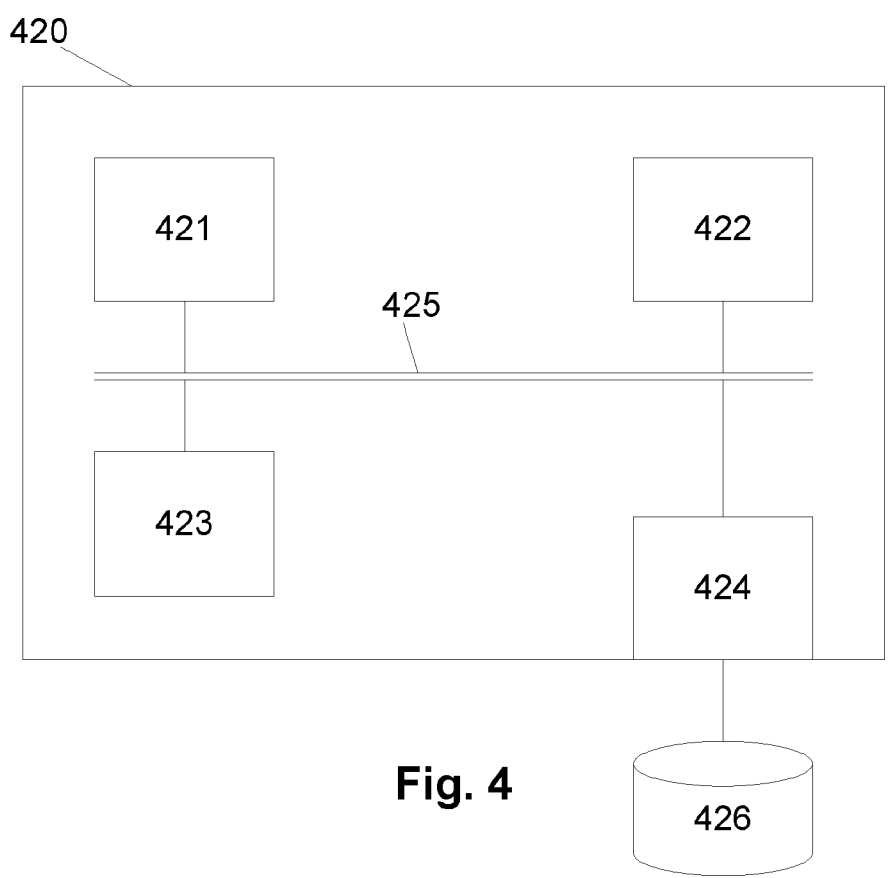
FIG. 4 is a schematic diagram of an example of a processing system.

In one example, the process is performed by one or more processing systems and an example of a suitable processing system 420 is shown in FIG. 4.

In this example, the processing system 420 includes at least one microprocessor 421, a memory 422, an optional input/output device 423, such as a keyboard and/or display, and an external interface 424, interconnected via a bus 425 as shown. In this example the external interface 424 can be utilised for connecting the processing system 420 to peripheral devices, such as communications networks, databases 426, other storage devices, or the like. Although a single external interface 424 is shown, this is for the purpose of example only, and in practice multiple interfaces using various methods (e.g. Ethernet, serial, USB, wireless or the like) may be provided.

In use, the microprocessor 421 executes instructions in the form of applications software stored in the memory 422 to allow the required processes to be performed. The applications software may include one or more software modules, and may be executed in a suitable execution environment, such as an operating system environment, or the like.

Accordingly, it will be appreciated that the processing system 420 may be formed from any suitable processing system, such as a suitably programmed client device, PC, web server, network server, or the like. In one particular example, the processing system 420 is a standard processing system such as an Intel Architecture based processing system, which executes software applications stored on non-volatile (e.g., hard disk) storage, although this is not essential. However, it will also be understood that the processing system could be any electronic processing device such as a microprocessor, microchip processor, logic gate configuration, firmware optionally associated with implementing logic such as an FPGA (Field Programmable Gate Array), or any other electronic device, system or arrangement.

However, it will be appreciated that the above described configuration assumed for the purpose of the following examples is not essential, and numerous other configurations may be used. For example, the process can be implemented using distributed arrangements, such as a client-server arrangement, cloud based or edge computing arrangement, or the like, depending on the particular implementation.

A specific example of the above described process for generating a colourised costmap to encode directionality within the costmap, and then subsequently using this for path planning will now be described in further detail.

Figure 5A:
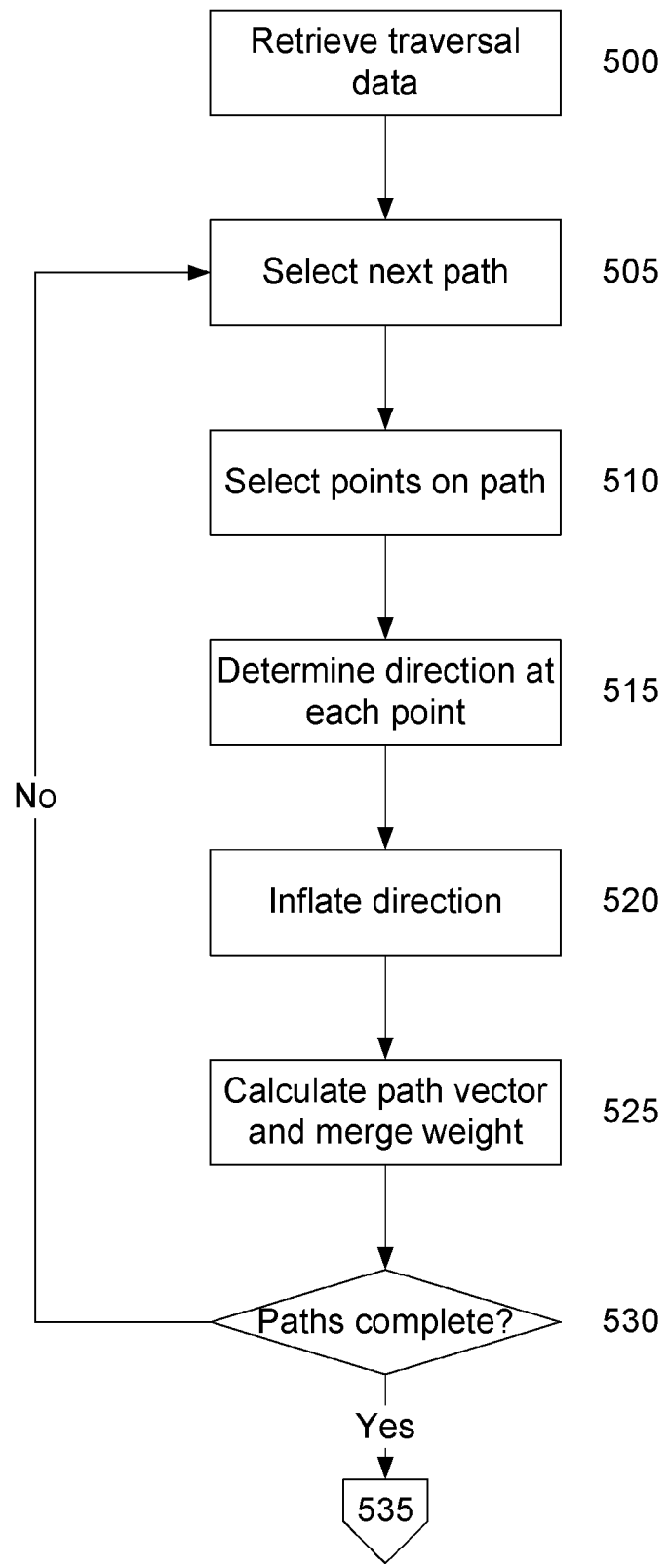
FIGS. 5A and 5B are a flow chart of a specific example of a process for generating a costmap for use in planning a path through an environment.
Figure 5B:
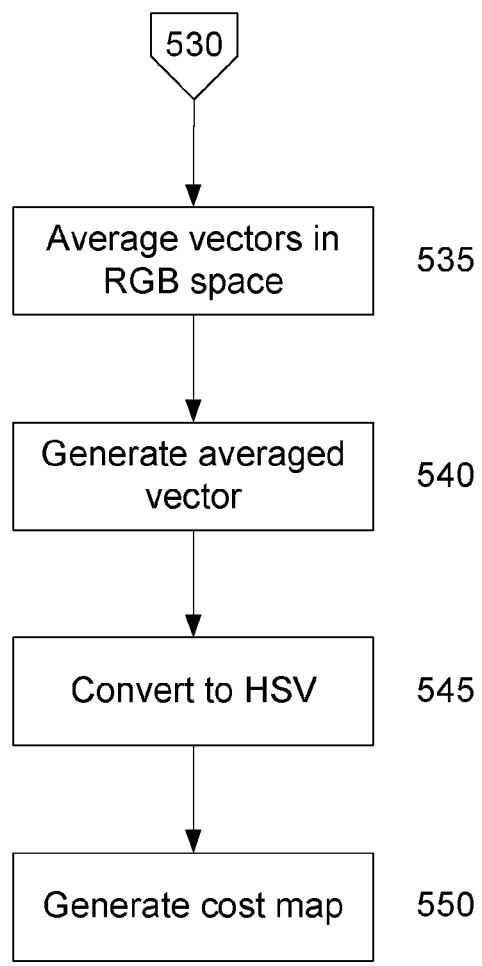

A specific example of a processor for generating costmap will now be described with reference to FIGS. 5A and 5B.

In this example, at step 500 the processing system 420 retrieves traversal data from the database 426. The traversal data represents data collected from vehicles travelling along paths through the environment and could be based on any positional data, such as a GPS coordinates, or mapping data, such as LiDAR data, or the like. The traversal data typically includes a number of different paths, which could be a route traversed multiple times by one or more vehicles, or different routes traversed by one or more vehicles.

At step 505, the processing device 420 selects a next path for analysis and then segments the path in order to select points on the path at step 510. The points are typically spaced by a predetermined distance, with this being used to avoid analysis of the entire length of a path, and thereby reduce computational requirements.

The processing system 420 determines a direction of travel at each point, at step 515. The direction of travel can be an orientation or pose of the vehicle (or a sensor mounted thereon) at the respective point, if this is known, and/or could be derived based on a trajectory traversed by the vehicle. For example, if the traversal data only includes location information, such as a sequence of GPS coordinates or similar, it may be necessary to interpolate these in order to derive a travel path, and hence infer the vehicle orientation.

At step 520, the processing system 420 operates to inflate the direction of travel, in order to effectively "spread out" the direction of travel to a region surrounding the point at which the direction of travel is determined. As the confidence of the exact direction of travel away from the point reduces, the direction is inflated in accordance with a merge weight at step 525, as will be described in more detail below.

This process is repeated for all points along the path, and when the path is complete it is determined if all paths are complete at step 530. If not, the process returns to step 505 to analyse a next path.

Once all paths have been completed, the processing system operates to average the path vectors for a part, such as a group of pixels in the environment map, in an RGB colour space at step 535. The averaging is performed in accordance with the merge weights, so that vectors distant from an actual point of measurement are given less weight in the overall averaging process. The averaging process is used to generate an average vector at step 540, which is then converted into the HSV colour space at step 545 to form the traversal indicator for the respective part of the environment. Once this has been performed, the traversal indicators are added to the costmap at step 550 to allow the costmap to be colourised.

Specific details of a preferred implementation will now be described in more detail.

As previously mentioned, global planners operate on a known map M. When navigating through the map M the vehicle navigates only through areas that are feasible, either because of physical, legislative or arbitrary constraints. Based on this inherent characteristic of how/where vehicles must travel, the current approach attempts to extract information from a vehicle trajectory (assuming the vehicle has a localisation system that provides such trajectory) to incorporate preferred directionality into the maps. A key challenge lies on how to effectively represent the directionality in a way that can be both mathematically interpreted by the path planning algorithm but also intuitively understood by human observers of that map.

In one example, the map is generated using SLAM algorithms, which concurrently creates the map and keeps track of the position of the sensor as it moves through the environment. Hence, any map M will have a trajectory T associated to it, where the trajectory T is the path taken by the sensor during the collection of data for mapping. In the case of autonomous operations for larger ground vehicles (e.g., cars, trucks, forklifts, industrial carriers, agricultural machinery, etc.), map generation in SLAM is usually carried out with the sensors mounted on the vehicles themselves (as opposed to maps created through handheld or aerial platforms, for example). As such, in the mapping process, the vehicle (and consequently the sensor) navigates only through areas that are feasible, either because of physical, legislative or arbitrary constraints. Based on this inherent characteristic of how maps are created, the current approach can extract information from the trajectory to incorporate preferred directionality in maps that are used for global planning.

The directionality is then represented in a way that can both mathematically interpreted by the path planning algorithm but also intuitively understood by human observers of that map.

As two-dimensional path planning algorithms for ground vehicles often analyse the costmap represented in an image data structure, the current approach represents directionality as different colours in a map.

In one example, paths on the costmap are colourised based on a two-dimensional orientation of the sensor during navigation, where the orientation can be in the range $[0, 2\pi]$. This colour encoding is done in the HSV colour space, in which the hue (H) component also has a circular representation falling in the range [0, 2π]. An example of this is shown in FIG. 6A to 6C.

Figure 6A:
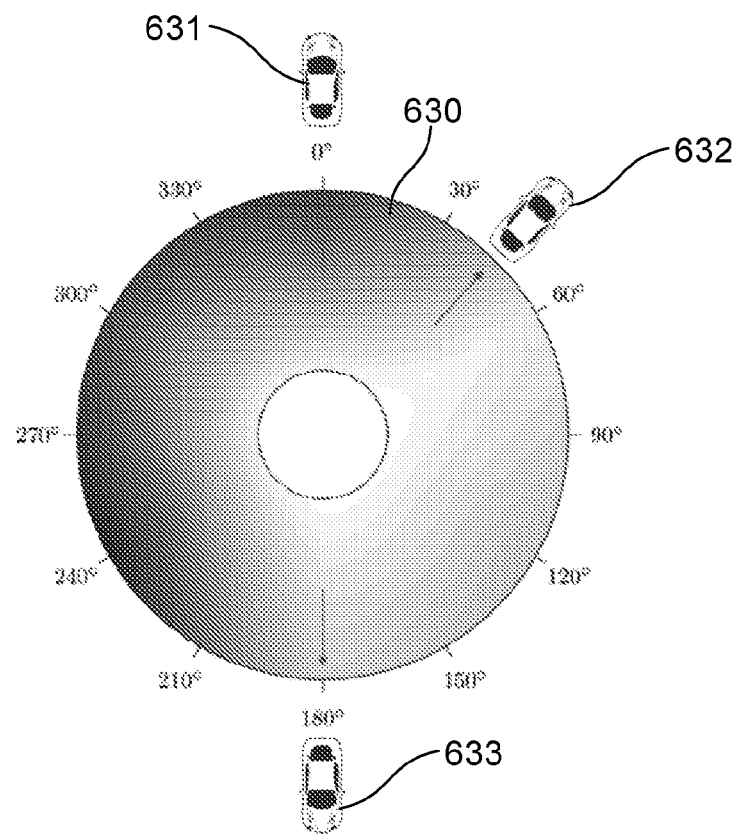
FIG. 6A is a schematic diagram of an example of a hue mapping for vehicles travelling in different directions.
Figure 6B:
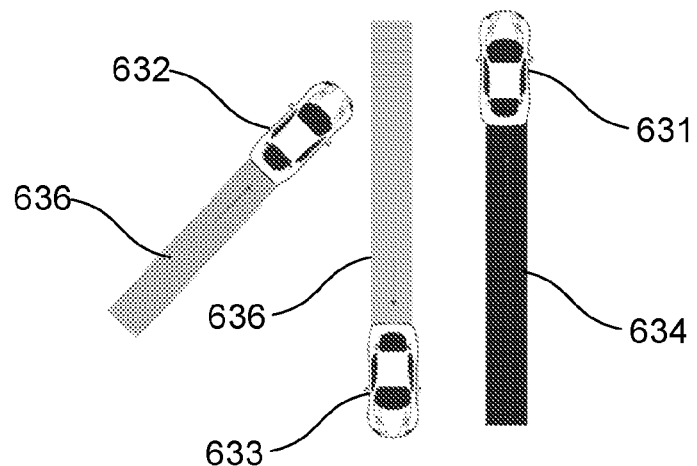
FIG. 6B is a schematic diagram of an example of path colours for vehicles travelling in different directions based on the hue mapping of FIG. 6A.

In this example, FIG. 6A shows a HSV hue mapping 630 associated with vehicles 631, 632, 633 travelling in different directions, with FIG. 6B showing the colours of the resulting vehicle paths 634, 635, 636.

Figure 6C:
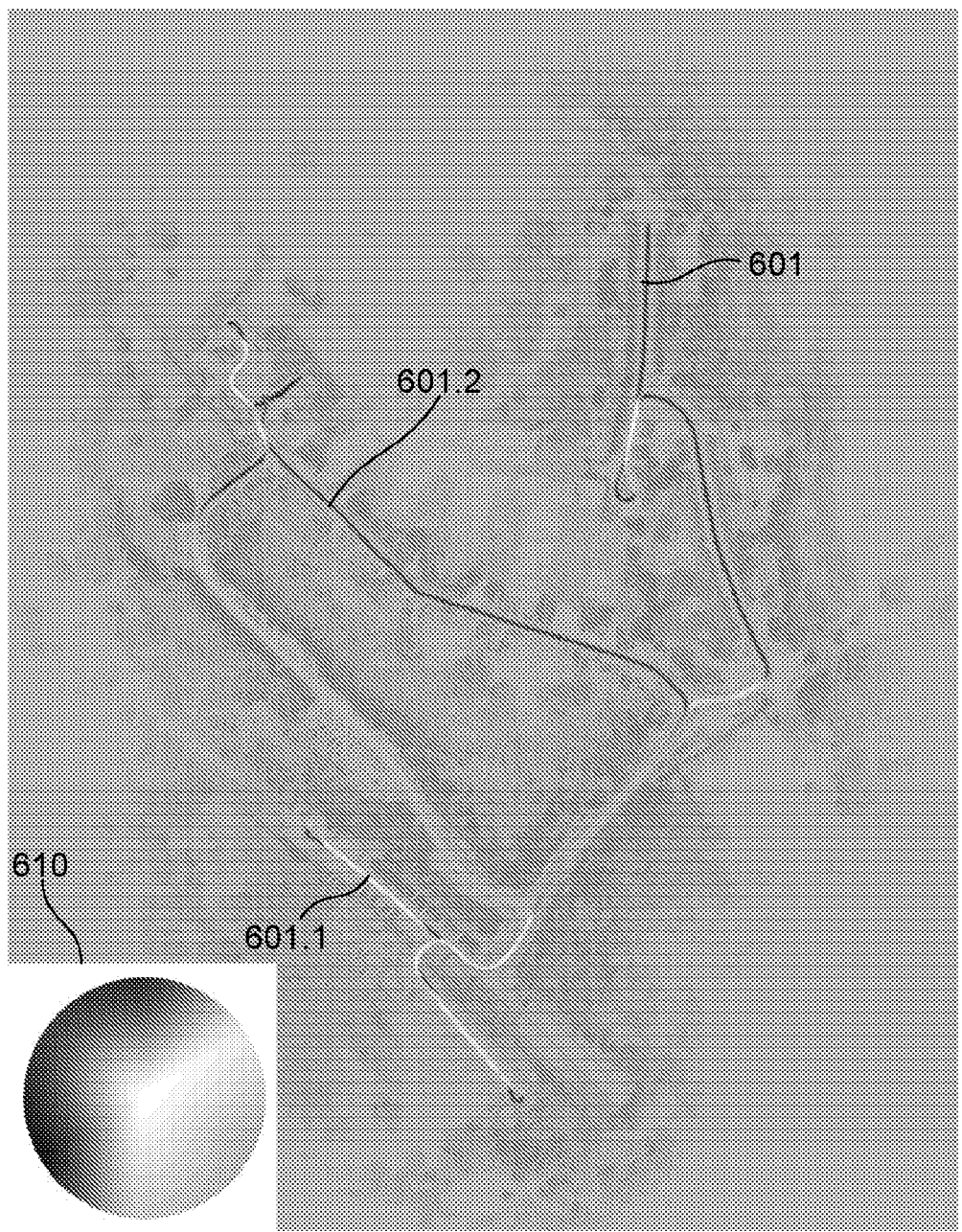
FIG. 6C is a schematic diagram of a costmap showing a number of vehicle paths through an environment.

An example of a resulting costmap generated by analysing multiple paths is shown in FIG. 6C, with this showing paths 601 colourised according to direction of travel of vehicles along the path. Thus, in this example, the hue (H) is used to denote the direction in which a vehicle are able to, and hence should go, when traversing a path.

Whilst a hue only could be used, more typically saturation (S) and value (V) components are also used, with the saturation component defining how important directionality is in a particular path (e.g., there are areas in which a vehicle can go in both directions without consequences and other areas where it is absolutely forbidden to go in a given way). A low directionality importance is illustrated in the "whitish" path segments 601.1, in FIG. 6C. In those segments, the vehicles traversed in multiple directions, therefore indicating the "two-way" nature of that path, consequently lowering the saturation. Finally, the value component represents the overall cost in the map, incorporating obstacles (i.e., a low value shown in black represents an obstacle).

In one example, to generate the costmap, a modified A* algorithm is used, such that the mathematical formulation incorporates the HSV costs in the optimisation, rather than only the free vs non-free space cost. The current approach adds minimal computational effort to the map generation process, but does potentially increase the computational complexity of path planning, depending on the number of colour channels considered.

For the purpose of illustration, the following examples make reference to a LiDAR-inertial algorithm based on the continuous-time SLAM, as it is suitable for autonomous vehicle operation environments. However, this is not essential, and it will be appreciated that this can be applied more broadly to any dataset that can be used to derive a viable vehicle trajectory through the environment.

In this example, a map restrictor approach is used as a basis for the generation of the costmap. In this regard, when navigating in pre-mapped areas to perform a given task it is reasonable to assume that in many cases the most desired path to be taken by the vehicle corresponds to a previously traversed path. With this assumption, a path of low cost can be added to a traditional costmap to encourage a planner to follow previously driven routes. This strategy relies upon the generation of a trajectory list in addition to any other requirements for the generation of a costmap. Biasing a planner to a previously driven path increases the likelihood that an efficient and safe route is taken without fully restricting the ability of the planner to deviate from the path.

However, this type of restriction suffers from naivety in regards to direction. This naivety is illustrated in the experiments in FIGS. 9 and 10, discussed in more detail below, which demonstrate how a costmap can be modified to give preference to previously traversed routes. Throughout the following description, this path biasing strategy is referred to as a "Map Restrictor" approach.

Standard costmaps are a scalar field representing the cost of passing through each point in the field. Usually this field is discretised as a two-dimensional or three-dimensional grid of values. These values determine a cost of traversing the grid cell and path planners then aim to minimise the integrated cost along the path length. There can be, however, an ambiguity in how these costs are represented.

For example, a cost C in the range $[0,1] \Rightarrow \{C \in : 0 \leq C \leq 1\}$ has the disadvantage that any obstacle, no matter how dangerous, can be traversed if the sum of costs along the path (including the obstacle) is less than the cost for all other paths. So instead, the current approach represents the cost by a 0 to 1 "utility value", which is the reciprocal of cost. This allows obstacles and solid road lines, for example, to be absolutely untraversable (infinite cost), and it means terrain never has zero cost, so there is always a unique minimal cost path.

For many driving tasks, the direction of travel needs to be encoded in the map so that, for instance, the planned path does not guide the vehicle into oncoming traffic. This requires a vector-field costmap which in two-dimensions can be discretised into an image of vector-valued pixels. It is convenient then that colour images and their corresponding editing software all use vector maps, where the vector space is the colour space of the image.

In the current approach the directional "utility value" is calculated from the dot product (.) of the candidate vehicle direction vector with the per-pixel colour vector, resulting in a signed value in the range of $[-1,1]$. However, as the utility value would desirably be in the range $[0,1]$, the constant 1 is added to the dot product and the resulting value is divided by 2. An advantage of the dot product is that the resulting cost is linear on the input data. This is relevant as the colour map can be derived from multiple driving paths over the environment, and linearity ensures that such averaging of the colour vectors corresponds to an average of the cost of those vectors.

The current approach uses the HSV colour space, depicted in FIGS. 7A and 7B, which show the traditional hue, saturation and value representation and a representation relating the colour space to the variables used in the descriptions in this work, respectively. In this example, the hue H represents the intended driving direction, saturation S defines the directionality weight and value V represents the overall cost C of the cell. For a given candidate direction d the cost is:

$$C = \frac{1}{V} + \frac{2}{S(1 + (\sin H, \cos H).d)}$$

This is a conical subset of a vector space and an example of this is shown in FIG. 7A, which shows the traditional representation with hue, saturation and value, and FIG. 7B, which relates this colour space to the Cartesian coordinate system used in the current example.

In these examples, the black represents the highest cost (regardless of the direction of travel), and white represents the lowest cost. A bright colour represents the lowest cost when travelling in the direction corresponding to the colour's hue. This choice fits the driving task as the highest cost areas (obstacles) are high cost regardless of the approach direction, but the lowest cost areas (roads, open fields, and other vehicle operation areas) are the ones where directionality may be relevant. In addition to loosely constraining the direction with the hue vector, the drive direction can be more strictly constrained using the value component V. As the environment is mapped, obstacles are marked as black (full cost), all remaining areas are marked as grey (medium cost). The driven trajectories are coloured according to the drive direction, and the colour interpolates to the default grey colour with distance from the trajectory path. This creates a set of softly bounded routes to constrain the driving direction.

In an omnidirectional area such as a compound or car park, the average of multiple drive passes over the same path in different directions creates an averaged white colour, as shown at 601.1 in FIG. 6C. This is brighter than the grey used as the non-obstacle default, which means that vehicles will still prefer to drive on the areas that were covered by vehicle traversals with no additional directional cost. It does not necessarily, however, forbid the vehicle to navigate to grey areas, as the system can be parameterised to only give less preference to grey, but not to avoid it completely in case a goal sits in one of that region.

Being a cone colour space, HSV allows direct mapping of directionality (Hue), directional certainty (Saturation) and obstacles (Value) in a format that is interpretable and editable by human operators. The addition of an obstacle layer in the form of the value component allows for biasing of the planner to previously driven paths but does not restrict the planner to these paths. The use of not only direction, but also directional certainty, addresses the ambiguity of intersecting paths and bidirectional travel.

Figure 8B:
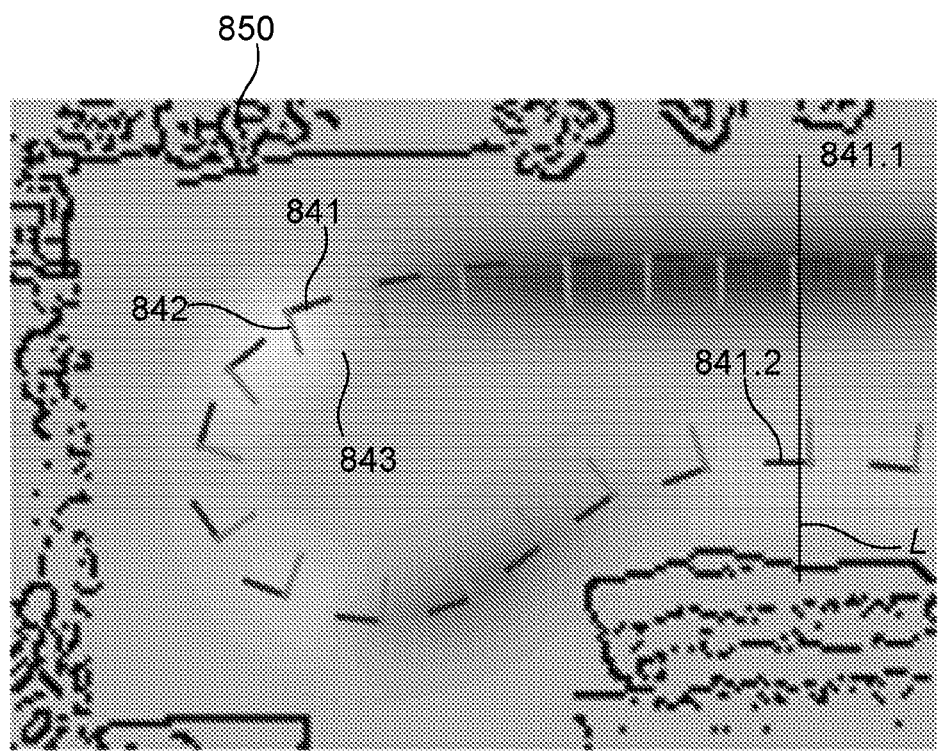
FIG. 8B is a schematic diagram of an example of a colourised path based on the sample vehicle trajectory of FIG. 8A.

In generating the costmap, as previously described the vehicle path is segmented into individual points, with a direction of travel at each point being used to generate a vector. An example of this is shown in FIG. 8A, which shows a vehicle orientation 841 indicative of a direction of travel, at each of a plurality of frames 842, representing the respective points on the path.

To provide the aforementioned smooth transitions from colour saturated paths to the default background colour and reduced saturation in bidirectional areas, two major processing steps must be completed:
inflation of the trajectory and
the averaging of colours.

Figure 8C:
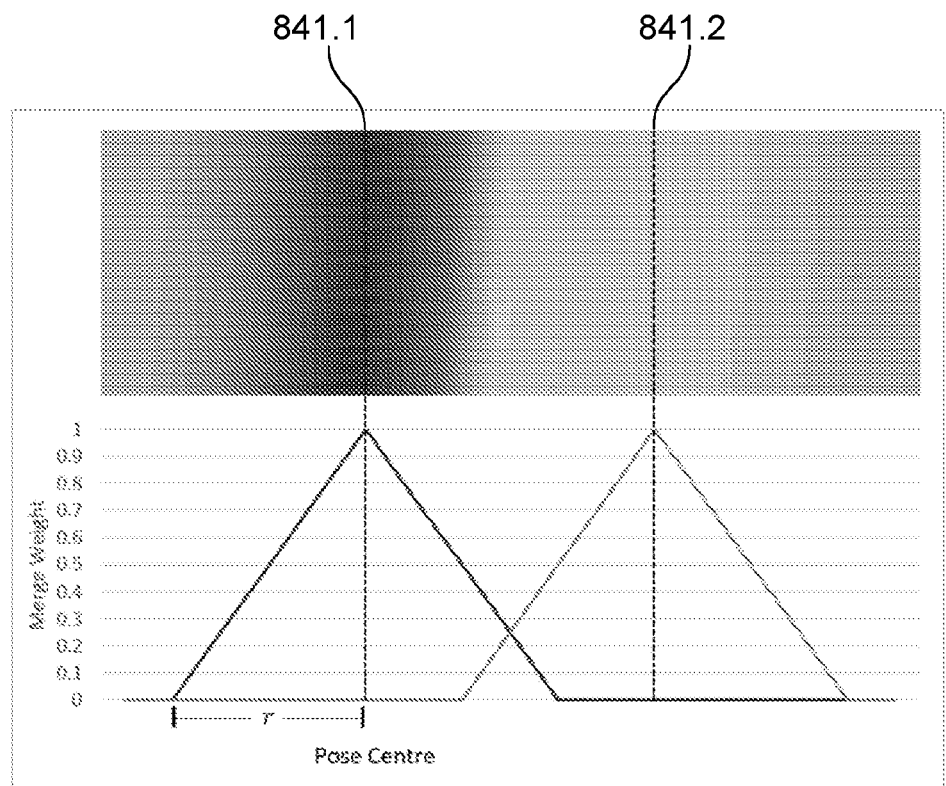
FIG. 8C is a schematic diagram of an example of a weighting function used to generate the colourised path of FIG. 8B.

To create the smooth transition, a radius of linearly decreasing merging weight a with maximum distance r is added to each pose in the trajectory T. To create the smooth transition, a linearly decreasing "merge weight" $\alpha$ ranging from 1 to 0 gradually reduces the saturation of the path. $\alpha$ is parameterised according to the maximum distance r from the centre of the trajectory T, as illustrated in FIG. 8C. In this example, a linear reduction in weight with distance is used, but this is not essential and other weightings, such as bell curves or other distributions could be employed. The direction of travel $\theta$ is extracted from the trajectory T and used to calculate a colour representation vector $c_n$ for each point within the distance r from the centre of the trajectory T. In this case:

$$x = \cos\theta$$
$$y = \sin\theta$$
$$z = 1$$
$$\alpha_n = 1 - \frac{\text{Distance from pose}}{r}$$
$$c_n = (x, y, z)$$

As there can be multiple vectors per pixel, an index n is assigned to each to distinguish between them. To effectively average the generated list of colours and produce desaturated colours in bidirectional areas, a weighted sum of the vectors generated from T and the background colour is computed. By averaging the x and y components of the colours rather than the direction, the saturation of the final colour can be reduced if the summed components act in opposite directions. In addition, by averaging the z components, a smooth transition to the background colour can be achieved.

$c_{Background}$ is defined as the vector containing the desired background colour, so for example, if the desired background colour is grey, the vector (0,0,0.7) could be used. In this instance:

$$\omega = \max(\alpha_0, \alpha_1, \ldots, \alpha_n)$$
$$\omega_0 = \sum_{n=0}^{n=N} \alpha_n$$

where N is the value of the largest index for that pixel.

Based on the equations above, an averaged vector for each pixel in the image can be calculated $c_{Average} = (x_{Avg}, y_{Avg}, z_{Avg})$ for each pixel in the image can be calculated.

$$c_{Average} = c_{Sum} \cdot \omega + c_{Background} \cdot \max(0, 1 - \omega_0)$$
$$c_{Sum} = \frac{\left(\sum_{n=0}^{n=N} \alpha_n \cdot c_n\right) + c_{Background} \cdot \max(0, 1 - \omega_0)}{\omega_0 + \max(0, 1 - \omega_0)}$$

This vector $c_{Average}$ is then converted back to the HSV colour space according to:

$$H = \arctan\frac{y_{Avg}}{x_{Avg}}$$
$$S = \sqrt{x_{Avg}^2 + y_{Avg}^2}$$
$$V = z_{Avg}$$

The resulting HSV values are incorporated into the costmap for use in path planning.

Thus, directions (poses) are extracted from the trajectory before being inflated as described in FIG. 8C. For each point within this inflated direction (pose), a colour vector is calculated and subsequently averaged using the above equations. The resulting values for each pixel are converted to HSV, before being written out for use as a costmap in planning.

A number of experiments were performed to test the costmap and path planning functionality as will now be described.

In particular, a number of scenarios are demonstrated comparing the above approach with standard costing approaches, illustrating the applicability of the method.

Although the approach is not restricted to any specific type of localisation strategy, the current examples use LiDAR-inertial mapping, using a SLAM algorithm. The sensors include a Velodyne PUCK VLP-16 LiDAR and a Microstrain-CVS-IMU. The LiDAR assembly is additionally mounted on a spinning base, angled at 45° for increased point coverage. The spinning base rotates at approximately 0.5 Hz and LiDAR measurements are streamed in at 20 Hz. The LiDAR is mounted at a height of 1.88 m above a robot frame. The system was implemented in C++ using ROS, running on a LGA1151 CPU2.8 GHz and 64 GB of RAM.

Three main scenarios were chosen to evaluate and illustrate the differences in behaviour between the current approach, a basic Map Restrictor approach, and Traditional Costing. The scenarios include a variety of typical road networks, industrial areas, and off-road environments. The Traditional Costing scenario refers to the free versus non-free binary costmap representation.

Figure 9A:
FIG. 9A is a schematic plan view of an example of a 3D point cloud used to generate a colourised costmap.
Figure 9B:
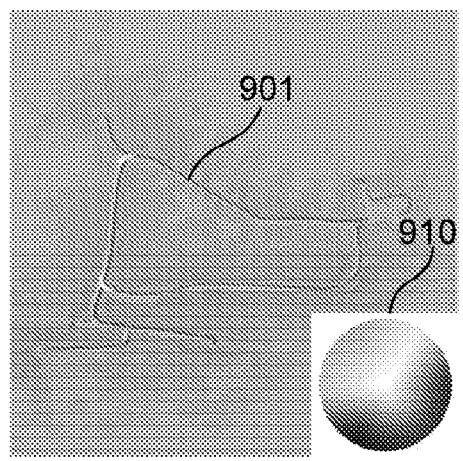
FIG. 9B is a schematic plan view of an example of a colourised costmap generated from the point cloud of FIG. 9A.
Figure 9C:
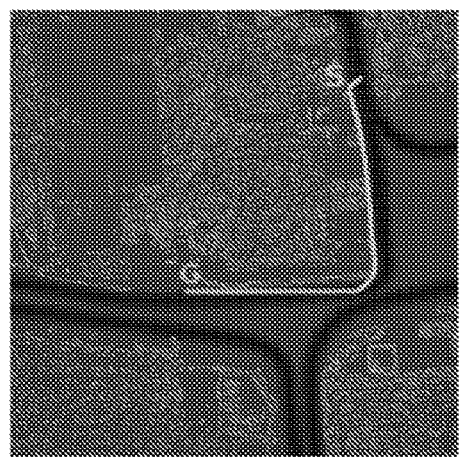
FIG. 9C is a schematic plan view of an example of a path calculated using traditional costing.
Figure 9D:
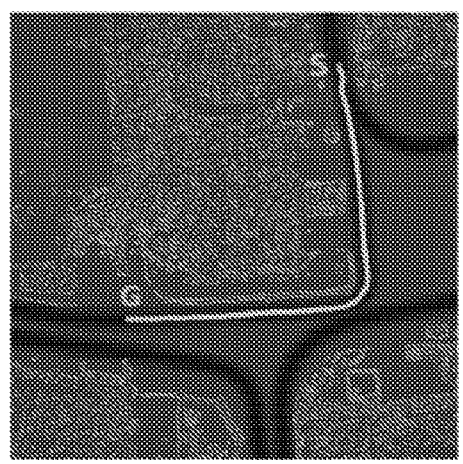
FIG. 9D is a schematic plan view of an example of a path calculated using map restrictor costing.
Figure 9E:
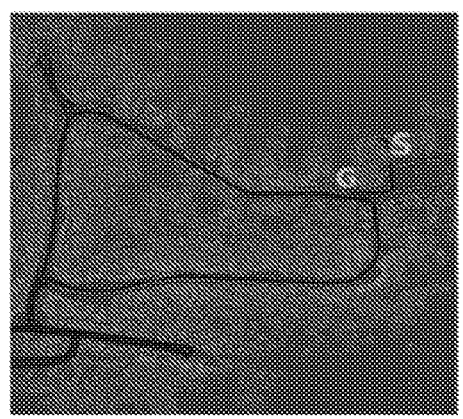
FIG. 9E is a schematic plan view of an example of a path calculated using the colourised costmap.

Scenario #1, depicted in FIGS. 9A to 9E, includes a costmap shown in FIG. 9B, having a laned roadway 901 and colour mapping 910 used for generating the costmap. A goal point G placed approximately 50 meters away from the starting point S. The. The shortest path to the goal, however, goes in the opposite direction of travel according to site rules. When direction is not important, a short direct path is desirable as shown by the paths created by Traditional Costing and Map Restrictor approaches, as shown in FIGS. 9C and 9D, respectively. If direction is important, the path taken with current approach, although significantly longer as it performs a full-loop, obeys the encoded rules of directionality, always remaining on the left hand side of the road, as shown in FIG. 9E.

Figure 10A:
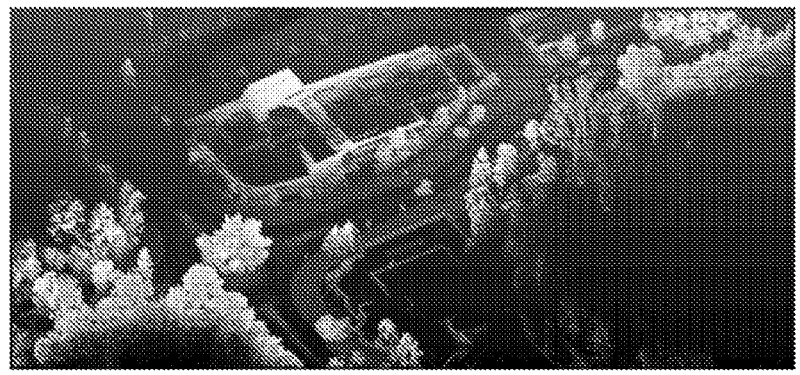
FIG. 10A is a schematic perspective view of an example of a 3D point cloud used to generate a colourised costmap.
Figure 10B:
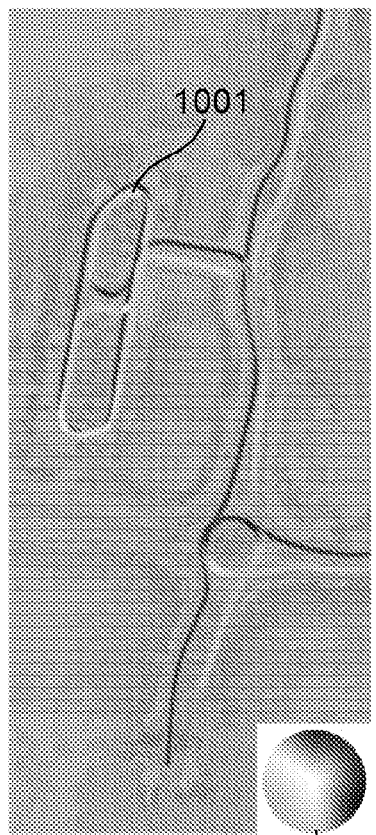
FIG. 10B is a schematic plan view of an example of a colourised costmap generated from the point cloud of FIG. 10A.
Figure 10C:
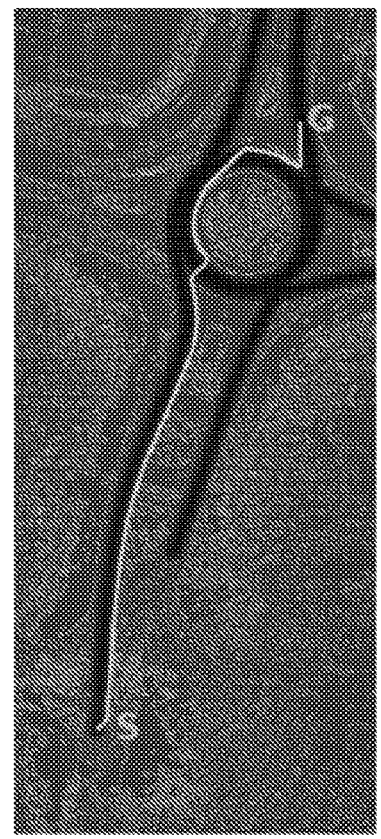
FIG. 10C is a schematic plan view of an example of a path calculated using traditional costing.
Figure 10D:
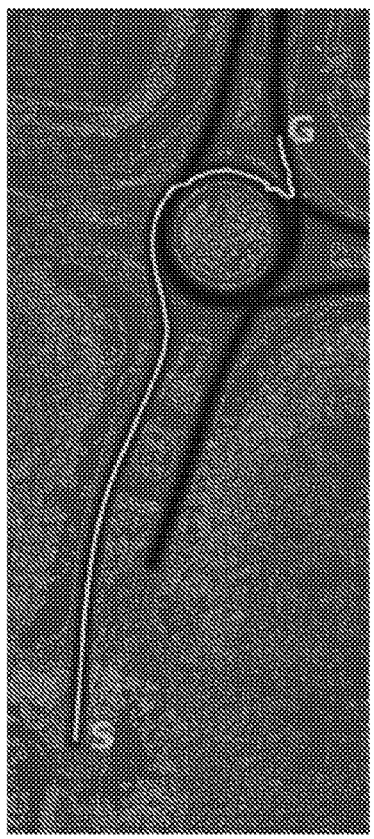
FIG. 10D is a schematic plan view of an example of a path calculated using map restrictor costing.
Figure 10E:
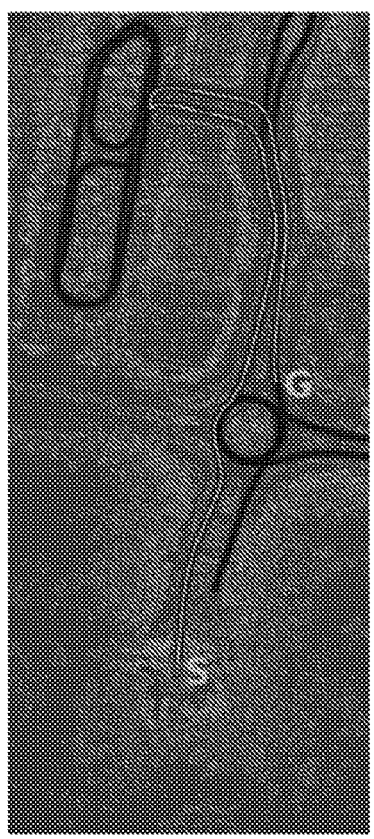
FIG. 10E is a schematic plan view of an example of a path calculated using the colourised costmap.

Scenario #2, shown in FIGS. 10A to 10E, again includes a costmap shown in FIG. 10B, including roads 1001 and a colour mapping 1010. A goal point G is placed approximately 50 meters away from the starting point S. This example demonstrates similar results with both the paths taken by Map Restrictor and Traditional Costing approaches shown in FIGS. 10C and 10D violating traffic rules. In contrast, the route taken by current approach shown in FIG. 10E is significantly longer but adheres to these rules. The difference between Map Restrictor and Traditional Costing is also highlighted in this scenario, with the path taken by the Map Restrictor being much smoother and more closely following the previously driven route, being a known plausible path.

Figure 11A:
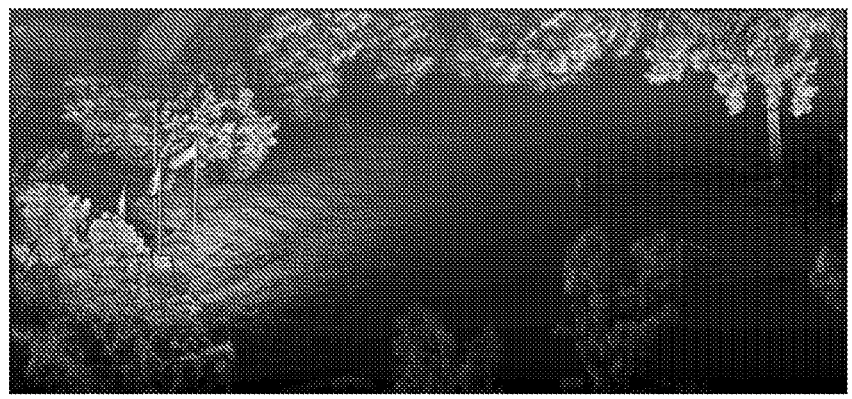
FIG. 11A is a schematic perspective view of an example of a 3D point cloud used to generate a colourised costmap.
Figure 11B:
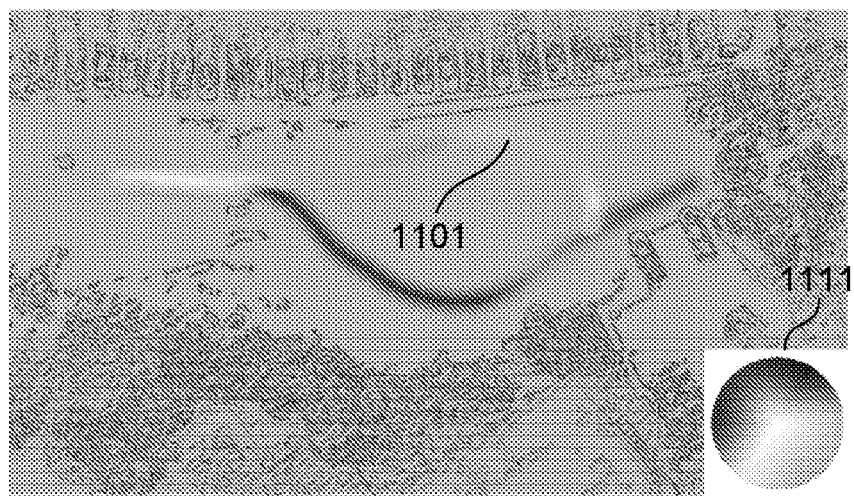
FIG. 11B is a schematic plan view of an example of a colourised costmap generated from the point cloud of FIG. 11A.
Figure 11C:
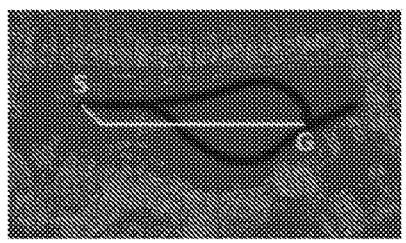
FIG. 11C is a schematic plan view of an example of a first path calculated using traditional costing.
Figure 11D:
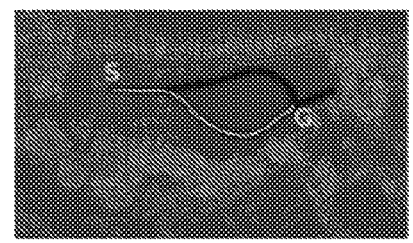
FIG. 11D is a schematic plan view of an example of a first path calculated using the colourised costmap.
Figure 11E:
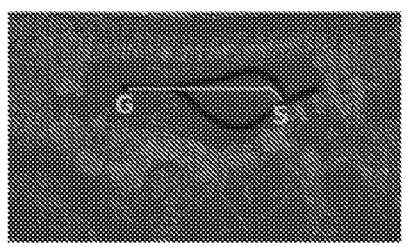
FIG. 11E is a schematic plan view of an example of a second path calculated using traditional costing; and, FIG. 11F is a schematic plan view of an example of a second path calculated using the colourised costmap.
Figure 11F:
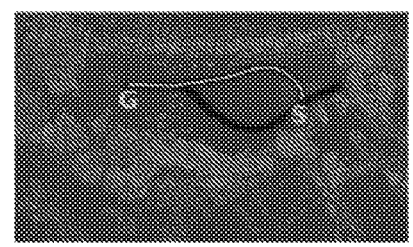

Scenario #3, shown in FIGS. 11A to 11F, consists of a very sloped off-road area. The costmap shown in FIG. 11B, includes traversed paths 1101 and colour mapping 1110 used for generating the costmap. When considering how to traverse up a slope, the desired path is often indirect, following a shallower ascent. Scenario #3 demonstrates both the paths taken by Map Restrictor and the current approach are shown in FIG. 11D, with both of these following a safe route encoded by past experience, following a shallow gradient. In contrast the route taken by traditional costing, shown in FIG. 11C directs the vehicle into the steepest section of the slope, placing the vehicle at risk of rolling. A secondary feature of off-road environments is that paths are often one directional. This characteristic is represented by both Map Restrictor and current approach again, allowing the vehicle to traverse down the slow and along a flat section of path, as shown in FIG. 11F, rather than placing the vehicle at risk by moving along the slope as is the case with traditional costing in FIG. 11E. Please note that in all figures showing trajectories in the experiments, the inverse colour is being displayed for visualisation purposes.

The computational complexity of the current approach is split into two parts. Table 1 shows the computing times for generating the required costmaps for the different scenarios, whilst Table 2 shows the times for computing the resulting trajectories. All the results were computed on a E5-2543 v3 CPU3.4 GHz and 126 GB$ of RAM.

TABLE 1

| Scenario # | Image Size | Number of Trajectories | Coloured Map (s) | Traditional Map (s) |
|---|---|---|---|---|
| 1 | 4072 × 4886 | 7195 | 617.16 | 374.35 |
| 2 | 10358 × 14096 | 15510 | 2555.33 | 754.94 |
| 3 and 4 | 1954 × 2419 | 1142 | 107.53 | 36.4 |

TABLE 2

| Scenario # | Traditional (s, m) | Map Restrictor (s, m) | Coloured Costmap (s, m) |
|---|---|---|---|
| 1 | 0.03, 51.63 | 0.04, 42.40 | 6.81, 732.07 |
| 2 | 0.05, 115.58 | 0.15, 121.18 | 2.75, 335.73 |
| 3 | 0.03, 49.29 | 0.05, 53.51 | 0.21, 53.82 |
| 4 | 0.03, 49.72 | 0.05, 53.62 | 0.22, 53.25 |

It can be seen in Table 1 that the additional time utilised in the inclusion of a coloured path is dependent on the size of the map and the number of trajectory points. This time can be seen to vary from approximately 1.8-3.5 times the time needed for an uncoloured map.

Table 2 shows the time cost of performing additional costing functions in the A* algorithm. However, it is important to note that times cannot be directly compared, but must be considered alongside the trajectory length.

Accordingly, the above described approach provides an efficient method to incorporate directionality in costmaps. The approach is applicable to map-based navigation, being particularly useful in areas which require autonomous navigation in a known map. In one example, the approach associates directionality in vehicle travel to directionality in the HSV colour space, using past travel direction to colourise the costmap, which, once colourised, is embedded with directionality preference.

In one specific example, the approach creates an analogy between the vehicle orientation angle and the hue angle in the Hue-Saturation-Value colour space, using the hue, saturation and value components to encode the direction, directionality and scalar cost, respectively, into a costmap image. A costing function can be used by the A* algorithm to incorporate this information into a path planning algorithm to allow path planning to be performed in an autonomous, semi-autonomous or manual process. The method adds minimal computational complexity to SLAM and yields significant benefits in a number of practical scenarios. Experiments demonstrate that the approach allows for proper path planning while standard binary costmaps would fail.

Whilst the above examples focus on directionality, the approach can be extrapolated to include any other information from the trajectory into the map, such as velocity, acceleration, or any other arbitrary state or behaviour of the vehicles.

Throughout this specification and claims which follow, unless the context requires otherwise, the word "comprise", and variations such as "comprises" or "comprising", will be understood to imply the inclusion of a stated integer or group of integers or steps but not the exclusion of any other integer or group of integers. As used herein and unless otherwise stated, the term "approximately" means ±20%.

Persons skilled in the art will appreciate that numerous variations and modifications will become apparent. All such variations and modifications which become apparent to persons skilled in the art, should be considered to fall within the spirit and scope that the invention broadly appearing before described.

The invention claimed is:

1. A system for generating a costmap for use in planning a path through an environment, the system including one or more programmed processing devices configured to:
   a) obtain a map of the environment;
   b) acquire traversal data indicative of an ability to traverse parts of the environment, the ability to traverse parts of the environment indicating limitations on traversal of the part of the environment;
   c) for each part of the environment, calculate a traversal indicator indicative of the ability to traverse the part, the traversal indicator being calculated in a colour space;
   d) colourise the map using the traversal indicators to thereby generate a colourised costmap indicative of an ability to traverse the environment, the colourised costmap allowing path planning to be performed, wherein the colour space is a hue/saturation/brightness colour space and the colourised costmap is colourised so that:
      i) an obstacle cost is indicated by a brightness component;
      ii) a directionality is indicated by a hue component; and,
      iii) a directionality cost is indicated by a saturation component;
   e) generate a path using the costmap; and,
   f) use the path to autonomously navigate a vehicle through the environment.

2. A system according to claim 1, wherein the colourised costmap is colourised:
   a) to indicate permitted directions of travel in different parts of the environment; and,
   b) so that different permitted directions of travel are indicated by different colours.

3. A system according to claim 1, wherein the traversal data is indicative of one or more paths within the environment and wherein the one or more processing devices are configured to:
   a) use the traversal data to calculate a path vector at each of a plurality of points along a path, the path vector being indicative of a direction of travel at that point on the path and being generated in the colour space, wherein the one or more processing devices are configured to:
      i) determine a traversal direction at a point along the path;
      ii) calculate the path vectors using the traversal direction by converting the traversal direction to the colour space;
      iii) acquire trajectory data indicative of a trajectory of a vehicle travelling along the path; and,
      iv) determine the traversal direction using the trajectory data; and,
   b) for each part of the environment:
      i) obtain path vectors within the part of the environment from one or more paths; and,
      ii) generate a traversal indicator using the path vectors.

4. A system according to claim 3, wherein the one or more processing devices are configured to:
   a) generate a traversal indicator by combining the path vectors;
   b) combine the path vectors in a different colour space;
   c) generate the traversal indicator by converting results of the combining step into the colour space; and,
   d) combine the path vectors in a Red Green Blue (RGB) colour space.

5. A system according to claim 3, wherein the one or more processing devices are configured to:
   a) determine a weighting associated with the path vectors;
   b) generate the traversal indicators using a weighted average of the path vectors; and,
   c) determine the weighting by inflating a direction of travel at the point on the path.

6. A system according to claim 1, wherein the one or more processing devices are configured to acquire the traversal data at least one of:
   a) in accordance with user input commands;
   b) by analyzing traversal of one or more vehicles through the environment;
   c) by receiving data from one or more vehicles through the environment; and,
   d) by receiving data from a mapping system, the mapping system including a mapping device that traverses the environment to thereby generate mapping data used to generate the map the environment.

7. A system according to claim 1, wherein the one or more processing devices are configured to:
   a) determine one or more candidate paths; and,
   b) display the one or more candidate paths on the colourised costmap to allow visual inspection of the one or more candidate paths.

8. A system according to claim 1, wherein the one or more processing devices are configured to:
   a) determine a start and goal; and,
   b) generate one or more candidate paths in accordance with the start and goal using the costmap.

9. A system according to claim 1, wherein the one or more processing devices are configured to:
   a) generate a path using the costmap; and,
   b) autonomously navigate the vehicle through the environment.

10. A method for generating a costmap for use in planning a path through an environment, the method including, in one or more programmed processing devices:
   a) obtaining a map of the environment;
   b) acquiring traversal data indicative of an ability to traverse parts of the environment, the ability to traverse parts of the environment indicating limitations on traversal of the part of the environment;
   c) for each part of the environment, calculating a traversal indicator indicative of the ability to traverse the part, the traversal indicator being calculated in a colour space;
   d) colourising the map using the traversal indicators to thereby generate a colourised costmap indicative of an ability to traverse the environment, the colourised costmap allowing path planning to be performed, wherein the colour space is a hue/saturation/brightness s color space and the colourised costmap is colourised so that:
      i) an obstacle cost is indicated by a brightness component;
      ii) a directionality is indicated by a hue component; and,
      iii) a directionality cost is indicated by a saturation component;
   e) generating a path using the costmap; and,
   f) using the path to autonomously navigate a vehicle through the environment.

11. A non-transitory computer program product for generating a costmap for use in planning a path through an environment, the computer program product including computer executable code, which when executed by one or more programmed processing devices causes the processing devices to:
   a) obtain a map of the environment;
   b) acquire traversal data indicative of an ability to traverse parts of the environment, the ability to traverse parts of the environment indicating limitations on traversal of the part of the environment;
   c) for each part of the environment, calculate a traversal indicator indicative of the ability to traverse the part, the traversal indicator being calculated in a colour space;
   d) colourise the map using the traversal indicators to thereby generate a colourised costmap indicative of an ability to traverse the environment, the colourised costmap allowing path planning to be performed, wherein the colour space is a hue/saturation/brightness colour space and the colourised costmap is colourised so that:
      i) an obstacle cost is indicated by a brightness component;
      ii) a directionality is indicated by a hue component; and,
      iii) a directionality cost is indicated by a saturation components;
   e) generate a path using the costmap; and,
   f) use the path to autonomously navigate a vehicle through the environment.

12. A system for planning a path through an environment, the system including one or more programmed processing devices configured to:
   a) obtain a colourised costmap indicative of a traversal ability of the environment, the traversal ability indicating limitations on traversal of the part of the environment;
   b) determine one or more candidate paths;
   c) use the one or more candidate paths and the colourised costmap to plan a path, the colourised costmap is colourised using a hue/saturation/brightness color space so that:
      i) an obstacle cost is indicated by a brightness component;
      ii) a directionality is indicated by a hue component; and,
      iii) a directionality cost is indicated by a saturation component;
   d) generate a path using the costmap; and,
   e) use the path to autonomously navigate the vehicle through the environment.

13. A system according to claim 12, wherein the one or more processing devices are configured to display the one or more candidate paths on the colourised costmap to allow visual inspection of the one or more candidate paths.

14. A system according to claim 12, wherein the colourised costmap is colourised:
   a) to indicate permitted directions of travel along multiple different paths; and,
   b) so that different permitted directions of travel are indicated by different colours.

15. A system according to claim 12, wherein the colour space is a hue/saturation/brightness colour space and the colourised costmap is colourised so that:
   a) a directionality is indicated by a hue;
   b) a coat associated with the directionality is indicated by a saturation; and,
   c) a secondary cost is indicated by the brightness.

16. A method for planning a path through an environment, the method including, in one or more programmed processing devices:
   a) obtaining a colourised costmap indicative of a traversal ability of the environment, the traversal ability indicating limitations on traversal of the part of the environment;
   b) determining one or more candidate paths;
   c) using the one or more candidate paths and the colourised costmap to plan a path, wherein the colourised costmap is colourised using a hue/saturation/brightness color space so that:
      i) an obstacle cost is indicated by a brightness component;
      ii) a directionality is indicated by a hue component; and,
      iii) a directionality cost is indicated by a saturation component;
   d) generating a path using the costmap; and,
   e) using the path to autonomously navigate the vehicle through the environment.

17. A non-transitory computer program product for planning a path through an environment, the computer program product including computer executable code, which when executed by one or more programmed processing devices causes the processing devices to:
   a) obtain a colourised costmap indicative of a traversal ability of the environment, the traversal ability indicating limitations on traversal of the part of the environment;
   b) determine one or more candidate paths;
   c) use the one or more candidate paths and the colourised costmap to plan a path, wherein the colourised costmap is colourised using a hue/saturation/brightness color space so that:
      i) an obstacle cost is indicated by a brightness component;
      ii) a directionality is indicated by a hue component; and,
      iii) a directionality cost is indicated by a saturation component;
   d) generate a path using the costmap; and,
   e) use the path to autonomously navigate the vehicle through the environment.

* * * * *